March 15, 1960 — E. V. HEITLINGER — 2,928,598

SIGNIFICANT DIGIT INDICATING MECHANISM FOR A SPLIT ACCUMULATOR MECHANISM

Filed May 27, 1953 — 3 Sheets-Sheet 1

INVENTOR.
Eugene V. Heitlinger
BY
Sheridan, Davis & Cargill
Att'ys

INVENTOR.
Eugene V. Heitlinger
BY Sheridan, Davis & Cargill
Att'ys

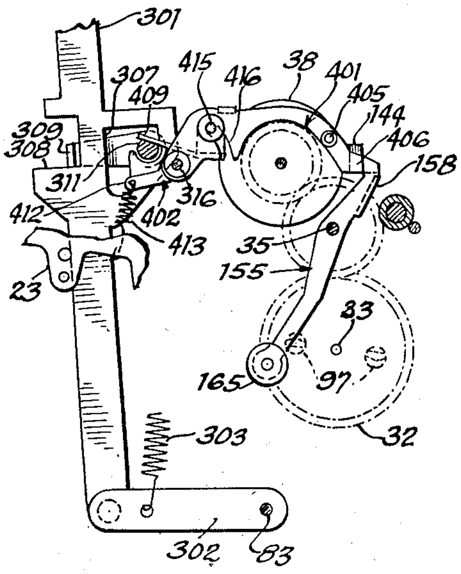
Fig. 7
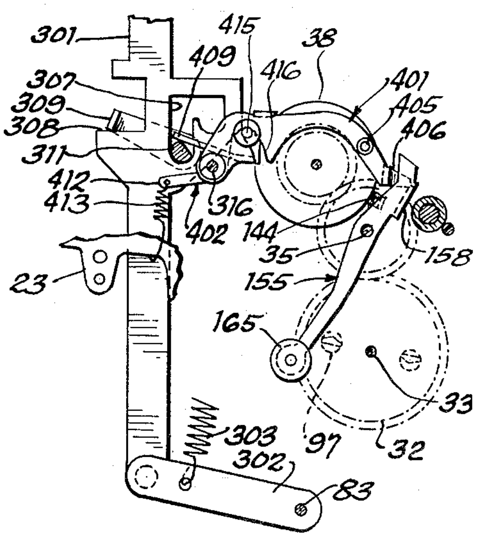
Fig. 8
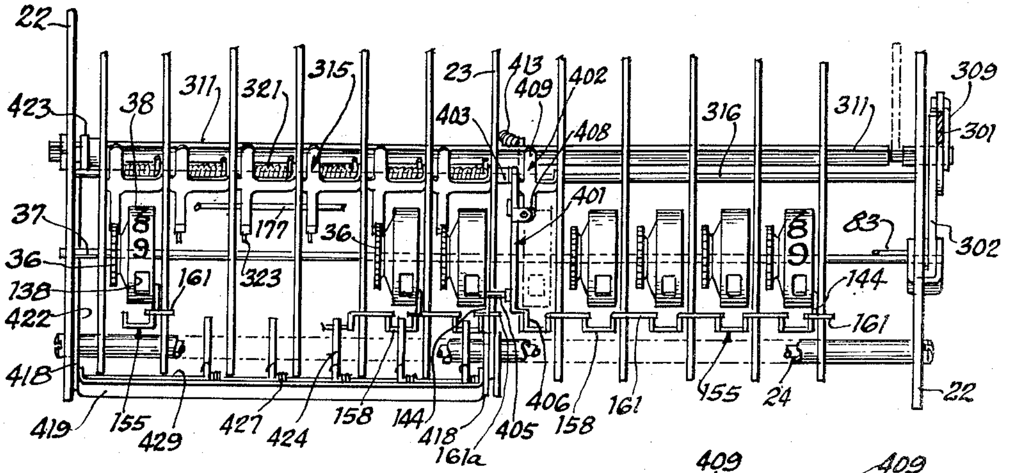
Fig. 9
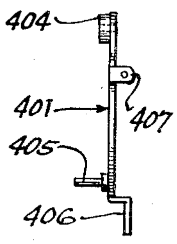
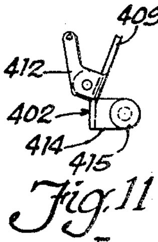
Fig. 11
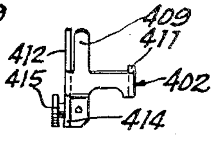
Fig. 12
INVENTOR.
Eugene V. Heitlinger
BY
Sheridan, Davis & Cargill
Att'ys
Fig. 10

2,928,598

SIGNIFICANT DIGIT INDICATING MECHANISM FOR A SPLIT ACCUMULATOR MECHANISM

Eugene V. Heitlinger, Franklin Park, Ill., assignor to Comptometer Corporation, a corporation of Illinois Application May 27, 1953, Serial No. 357,822

17 Claims. (Cl. 235—82)

This invention relates in general to calculating machines, and more particularly to significant digit indicating mechanism for multi-denominational accumulators.

Means have been provided in prior machines having multidenominational registers or accumulators for preventing errors in the reading of the answers or results registered by the numeral wheels thereof in the form of significant digit indicating mechanism for automatically visually distinguishing the denominational orders which should be read from those which should not be read as a part of any registered answer or result. In one such particular machine, that disclosed in U.S. Patent No. 2,346,601, issued April 11, 1944, the mechanism for that purpose comprises an indicator in the form of an internal shutter associated with the numeral wheel or other indicia bearing member of each denominational order of the accumulator, with the several indicators so arranged that operation of any numeral wheel to register a digital value results in the indicators associated with that numeral wheel and those in all lower denominational orders being moved automatically to indicating positions and remaining therein until a zeroizing operation clears the accumulator.

Means also have been provided in a similar prior machine having a multi-denominational accumulator for splitting the accumulator to enable the machine to be employed optionally, either in a normal manner, or as though it had two adjacently located but wholly independent accumulators, by the addition of selectively settable mechanism for preventing the numeral wheels in certain denominational orders from being returned to zero position upon operation of the regular zeroizing control member to return the other numeral wheels of the accumulator to zero position. Different embodiments of such split accumulator mechanism are disclosed in United States Letters Patent No. 2,656,110, issued October 20, 1953, and No. 2,599,257, issued June 3, 1952.

To incorporate such split accumulator mechanism in a machine having the significant digit indicating mechanism referred to, however, it was found necessary to eliminate the interconnection between the adjacent denominational orders of the indicating mechanism at the point of the split, in order to prevent erroneous reading of the various answers or results and to visually maintain those registered on the different portions of the accumulator separate from each other when the machine was set for split operation. This resulted in inaccurate or improper operation of the significant digit indicators during normal use of the machine. Also, with or without such separation of the overlapping feature of the significant digit indicating mechanism at the point of the split, improper actuation of the indicators or shutters resulted during use of the machine when the split accumulator mechanism was employed. Under such circumstances zeroizing of the right side or right-hand split portion of the accumulator alone, which should not affect the left-hand split portion, actually returns the significant digit indicators or numeral wheel shutters in that left side of the accumulator to their normal or blanking position and latches them therein.

A principal object of the instant invention, therefore, is to enable such significant digit indicators to be employed in multi-denominational accumulator machine having selectively operable split accumulator mechanism so as to be assured that it will function properly during both normal and split operations.

Another object is to provide added novel bridging mechanism between those denominational orders comprising the lowest and highest orders of respectively adjacent left-hand and right-hand sections of an accumulator in a split accumulator machine having an interrupted train of significant digit indicating mechanism, where that train is interrupted to insure independent functioning of the resulting separate sections of indicating mechanism during split operations, and to so arrange that bridging mechanism that it normally actuates the significant digit indicator in the highest order of the lower or right-hand section in response to operation of the indicator in the lowest order of the higher or left-hand section and is rendered inoperative automatically in response to setting of the machine for split operation.

A further important object is to prevent return of those actuated significant digit indicators or shutters from indicating position and retention thereof in normal or blanking position in the higher or left-hand section of such a machine during split operations and in response to zeroizing of the lower or right-hand section only, while not interfering with such return of the actuated shutters in the lower or right-hand section and retention or latching thereof in blanking or normal position. This object is attained in the embodiment herein illustrated, which employs split accumulator mechanism and significant digit indicating mechanism substantially like that noted above as old and including an indicator or shutter latch in each order, by adding a normally inoperative latch retaining member in each order of the left-hand section and control means operable automatically in the setting of the machine for split operations to render such retaining members operable to hold their associated latches in shutter releasing position, as soon as they are tripped thereto in the usual way in response to digital actuation of the left-hand section, and to maintain said latches inoperative until the machine is reset for normal operations.

Numerous other objects and advantages of the invention will be apparent as it is better understood from the following description, which, when taken in connection with the accompanying drawings, discloses a preferred embodiment thereof.

In the drawings:

Fig. 7 is a detail longitudinal section, taken substantially on the line 7—7 of Fig. 2, showing the selectively operable control member for the split accumulator mechanism and the bridging mechanism for the significant digit indicators in their operative positions assumed when the machine is set for split accumulator operation;

Fig. 8 is a sectional view similar to Fig. 7 showing the same parts in their inoperative positions assumed when the machine is set for normal operation;

Fig. 9 is a detail top plan view of the accumulator, with parts broken away and omitted to better illustrate the instant invention;

Fig. 10 is a detail top plan of the bridging lever;

Fig. 11 is a side view of the bridging lever blocking pawl; and

Fig. 12 is a detail top plan view of the pawl of Fig. 11.

Figure 1:
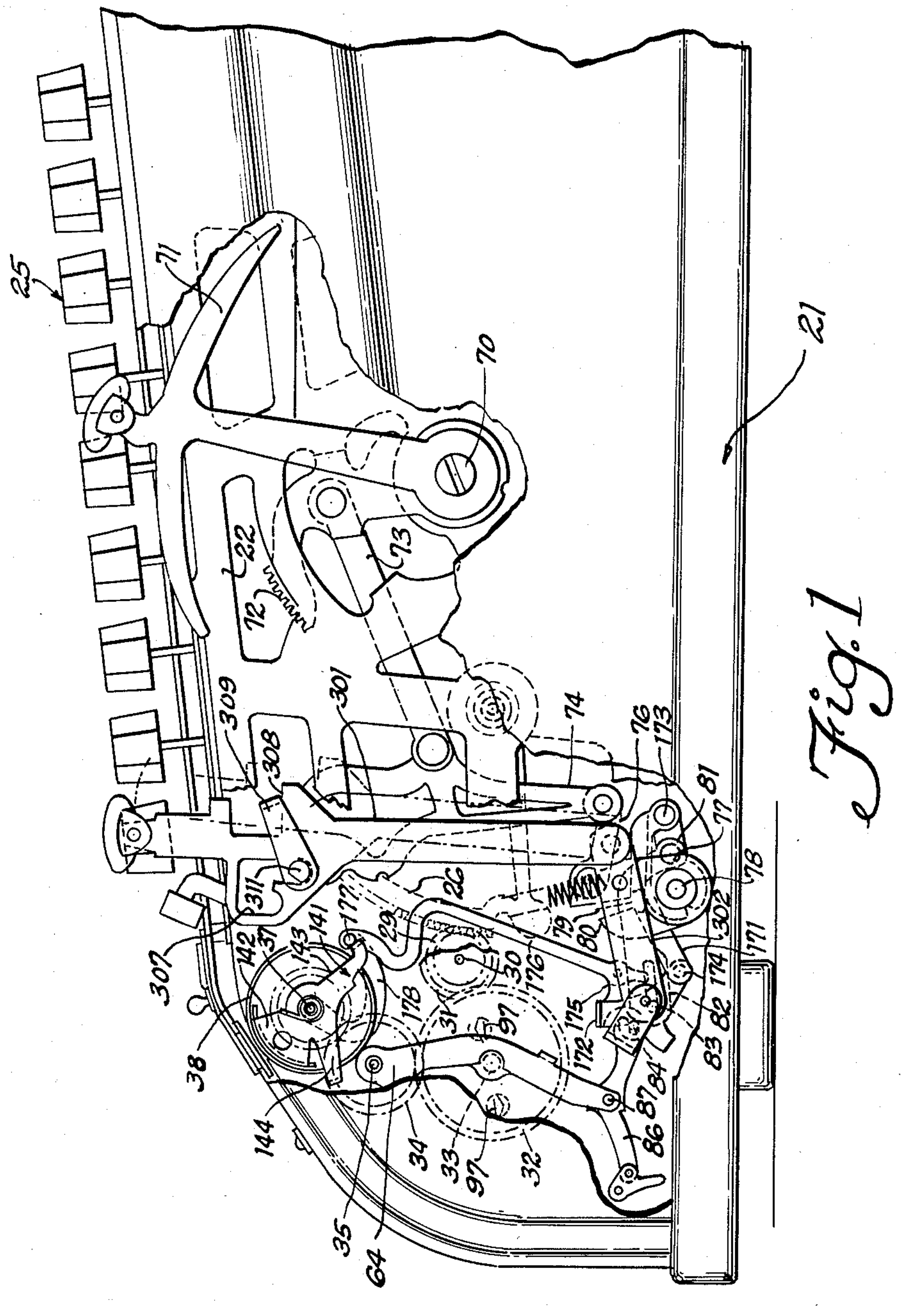
Figure 1 is a side elevation of a calculating machine embodying the present invention, as seen from the right side of the machine, with parts thereof broken away to disclose the zeroizing handle, the mechanism actuated thereby and parts of the accumulator.

Referring more particularly to the drawings, the invention is disclosed for illustrative purposes as embodied in a multi-denominational order calculating machine of the type generally known by the registered trademark "Comptometer," but it is not intended to be limited to use in that specific machine, since it is equally applicable to any other multi-denominational order accumulator machine incorporating split accumulator and significant digit mechanisms, including those in which the denominational orders containing the split mechanism are arranged or located relative to the regular orders not containing such mechanism differently from that of the illustrated embodiment of the invention. Only so much of the old calculating machine mechanism will be described herein as is necessary to a complete description and understanding of the instant invention. Specific details of the old mechanism are contained in United States Letters Patent No. 767,107, dated August 9, 1904, No. 960,528, issued June 7, 1910, No. 1,357,748, dated November 2, 1920, No. 2,021,393, issued November 19, 1935, No. 2,063,962, dated December 15, 1936, No. 2,224,203, dated December 10, 1940, No. 2,278,183, issued March 31, 1942, No. 2,346,601, dated April 11, 1944, No. 2,402,569, dated June 25, 1946, No. 2,599,257, issued June 3, 1952, and No. 2,656,110, dated October 20, 1953. As disclosed therein, and particularly in No. 1,357,748 and No. 2,063,962, the illustrated actuating, accumulating, and zeroizing or clearing mechanisms are supported in well-known manner in a casing 21 (Fig. 1) by a frame comprising side skeleton plates 22, spaced intermediate skeleton plates 23 separating the various denominational orders of those mechanisms (Fig. 2) and transverse tie-rods 24. Each denominational order of the actuating mechanism, as shown in detail in Patent No. 2,063,962, includes a row of digit keys 25 (Fig. 1), a column actuator or pivoted rack sector 26 movable downwardly from its position of Fig. 1 a variable distance by suitable power mechanism, in response to depression of a digit key 25, and thereafter automatically returned upwardly by a spring tensioned by the power mechanism, and an accumulator pinion 29 in mesh with sector 26 and mounted on a shaft 30 for rotation by the rack sector and connected by pawl and ratchet mechanism (not shown) to a transmitting or driving gear 31, also rotatably mounted on the transverse shaft 30, to rotate gear 31 only in response to upward movements of rack sector 26, all arranged in well-known manner to selectively actuate the associated denominational order of the accumulator in varying degrees corresponding to the digital value of the depressed key 25.

Each order of the multi-denominational order accumulator, as shown in detail in Patent No. 1,357,748, includes a gear train which comprises a carrying gear 32 rotatable on a transverse shaft 33 and adapted to mesh with the associated driving gear 31, an intermediate gear 34 rotatable on a transverse shaft 35 and in mesh with the carrying gear 32, and a numeral wheel gear 36 (Fig. 2) rotatable on a transverse shaft 37 and in mesh with the intermediate gear 34, and a numeral wheel 38 fixed to the gear 36. The numeral wheels 38 are of hollow construction with a peripheral flange bearing the ordinal numerals 1 to 9 and having a cipher-shaped aperture 138 therethrough instead of a zero. When the numeral wheels in their cleared or zero position, the cipher-shaped aperture 138 will visually register with the usual accumulator sight apertures in the forward part of casing 21.

In the illustrated machine, the means employed for zeroizing or clearing of the numeral wheels 38 comprises, as will best be understood from Patent No. 1,357,748, a carrying spring associated with each carrying gear 32 and wound up thereby during calculating actuation. The shafts 30, 35, and 37 are suitably supported by the skeleton frame in fixed relation with one another, and the shaft 33 is carried in a swingable frame including spaced partition plates 64 (Fig. 1). This swingable frame carrying shaft 33 is mounted for limited pivotal movement on shaft 35 to detrain the carrying gears 32 from their normal meshing relationship with driving gears 31 in zeroizing or clearing the accumulator. When the gears 32 are so de-trained from gears 31, the carrying springs are permitted to unwind to rotate the gears 32, 34, 36 to reversely rotate or return the numeral wheels 38 to their zero position. For effecting such detraining of gears 32 and 31, a zeroizing handle or crank 71 (Fig. 1) secured on a short transverse shaft 70, which is journaled in the right frame plate 22, is adapted to impart limited rotating movement in a counterclockwise direction (as shown in Fig. 1) to a transverse shaft 78 by a series of pivotally connected members. That series of members consists of a segment 72 secured on the inner end of shaft 70, a link 73, a depending lever 74, a short link 76, an arm 77 rotatably mounted on a suitable bearing retainer for shaft 78 and having a shoulder 79, and an arm 80 fixed on shaft 78 and engageable by the shoulder 79 when the zeroizing crank 71 is moved forwardly (to the left in Fig. 1) to rotate shaft 78. Such counterclockwise rotation of shaft 78 is transmitted to the swingable frame by a plurality of rocker arms 81 provided in spaced relation to each other transversely of the machine and secured at their forward ends to shaft 78, curved links 82 which are pivotally connected at their rear ends to arms 81, have an elongated slot embracing a stationary transverse shaft 83, and are provided at their forward ends with a pin 84, and toggle members 86, each having a bifurcated rear end embracing a pin 84 and being pivotally mounted intermediate its ends on a shaft 87 carried by the swingable frame members 64. Thus the counterclockwise rotation of shaft 78 caused by forward movement of zeroizing crank 71 (to the left in Fig. 1) results in a forward and downward movement of pins 84 which, by their engagement with the bifurcated ends of toggle members 86, swings shaft 87 and frame members 64 forwardly about shaft 35 to detrain carrying gears 32 from driving gears 31. Thereupon the carrying springs are permitted to unwind to reversely rotate their numeral wheels 38. They are stopped in their cleared or zero position by stop arms which are projected into the path of one or the other of a pair of diametrically positioned zero stop pins 97 on each carrying gear 32. The toggle members 86 function to maintain the swingable accumulator frame in this forward, gear-detraining or zeroized position, following release and return of zeroizing crank 71, and until the next depression of any one of the digit keys 25, the resulting operation of the actuating mechanism returning the parts to their gear-engaging positions of Fig. 1 in well-known manner. It will be appreciated that downward movement of a rack sector 26 imparts no rotation to its associated driving gear 31 by virtue of the pawl and ratchet mechanism interposed between pinion 29 and gear 31 and that accumulative actuation of gears 31, 32, 34, and 36 is effected only upon return or upward movement of the rack section 26, which will take place only when gears 31 and 32 are in mesh.

The significant digit indicating mechanism herein disclosed includes the following well-known members, which are designated by the same reference numerals as employed in Patent No. 2,346,601, wherein they are described and illustrated in greater detail. Interiorly of each of the hollow numeral wheel shells 38 and rotatably supported by their shaft 37 is an indicator or shutter 141 (Figs. 3 and 4) provided with a sector portion or significant digit indicator 142, a resetting arm 143 and a latching arm 144. Each sector 142 terminates in an arcuate lateral flange divided visually into a blanking portion 145 having the same color as the numeral indicia background of the associated numeral wheel 38, and an indicating portion 146 having a different and distinctive color, preferably the same as the associated numeral wheel indicia. These flange portions 145, 146, thus indicate or register a blank and a cipher indice, respectively, when in registration or visual coincidence with the cipher-shaped aperture 138 of the corresponding numeral wheel. The resetting and latching arms 143 and 144 are laterally offset to extend beyond the periphery of the numeral wheel, the latching arm 144 terminating in a flange or shoulder 148 (Figs. 2 and 9), and a coil spring 153 (Fig. 4) is mounted to urge the indicator device 141 in a counterclockwise direction (viewing Figs. 3 and 4) to depress its latching arm 144. Such movement of each indicator 141 from its blanking position normally is prevented by a denominationally associated latch lever or shutter trip-off crank 155. Each latch lever 155 is pivotally mounted on the shaft 35, is provided at its upper end with a transverse portion 158 and an operating portion or arm 161 extending laterally to the right of the machine (Figs. 2 and 9), and is urged for clockwise movement in Figs. 3 and 4 by a spring 162. Each latch lever 155 is adapted to be moved in the opposite direction from its normal or latching position of Fig. 4 to its actuated or released position of Fig. 3 by one or the other of the denominationally associated zero stop pins 97 engaging and moving downwardly past a roll 165 disposed on the lower end of the latch lever.

Figure 2:
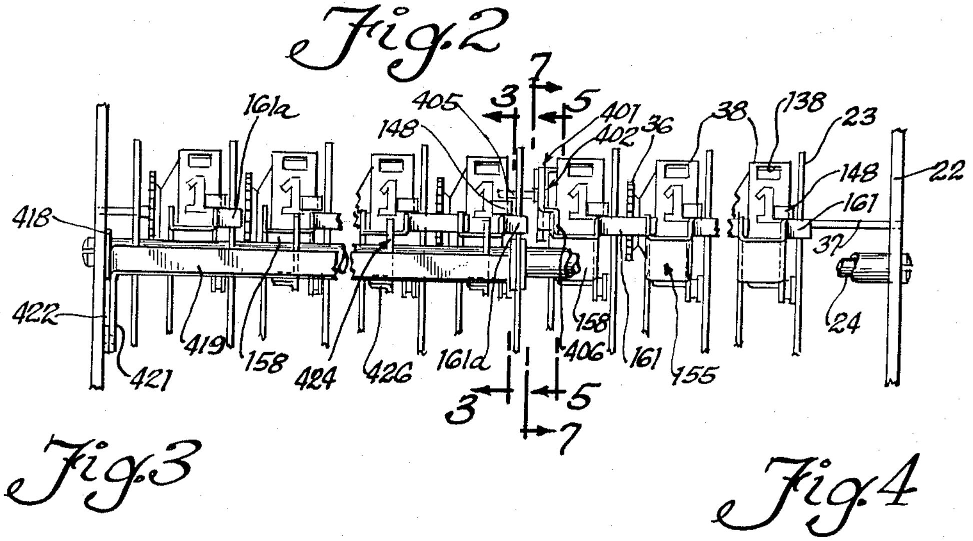
Fig. 2 is a detail vertical elevation, with parts broken away, as seen from the front of the accumulator.
Figure 3:
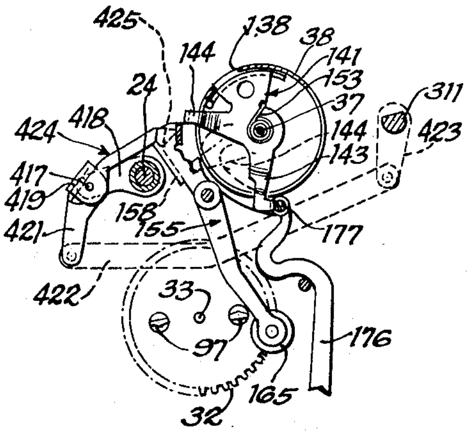
Fig. 3 is a detail longitudinal section, taken substantially on the line 3—3 of Fig. 2, showing part of the significant digit indicating mechanism in the position assumed when the machine is set for split accumulator operation.
Figure 4:
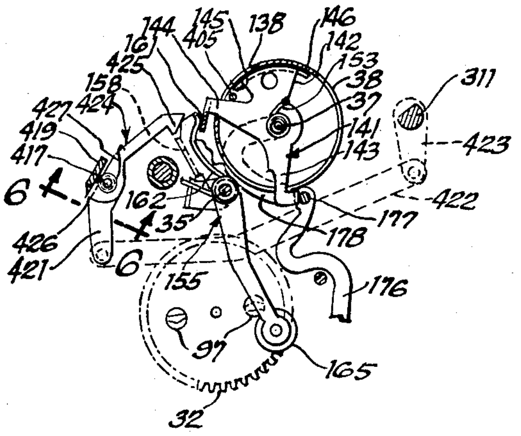
Fig. 4 is a view similar to Fig. 3 with the parts shown in the position assumed when the machine is set for normal operation.

The significant digit indicators or shutters 141 are all in their blanking position, with the flange portions 145 registering with apertures 138 in the numeral wheels 38, when the accumulator is cleared, as illustrated in Figs. 2, 4, and 9. As previously explained, subsequent depression of any one of the digit keys 25 first results in rearward swinging of the accumulator rock frame to reengage all of the carrying gears 32 with their driving gears 31, and the accumulative actuation of the driving gear 31 denominationally associated with the depressed digit key takes place only following depression of that key and during the subsequent upward movement of the associated sector 26. Consequently, before the denominationally associated carrying gear 32 is thereby actuated, it will have assumed its rearward entrained position of Figs. 1 and 4. The resulting accumulative actuation of this carrying gear 32, even though only in sufficient degree to register "1" on its associated numeral wheel, will cause one or the other of its zero stop pins 97 to move downwardly from the position illustrated on the right side of the gear in Fig. 4 past the roll 165 to move the latter and the lower end of the associated latching lever 155 rearwardly. This releasing movement of latch lever 155 is in a counterclockwise direction about the shaft 35 from the position illustrated in Fig. 4 to that shown in Fig. 3, and displaces its operating arm 161 from engagement with the flange 148 on the latching arm 144 of the associated shutter 141 to permit the latter to be rotated in a counterclockwise direction (as viewed from the right side of the machine) by its spring 153 from its blanking position of Fig. 4 to its indicating position of Fig. 1. In that position, the latch arm 144 then engages a vertical portion of the latch lever 155 to retain the latter in released position, as shown in broken lines in Fig. 3. As will best be appreciated from Figs. 2 and 9, the right-hand end of the operating arm 161 on each of the latch levers 155 of this old mechanism extends into the next lower denominational order and engages behind the upper end of the latch lever 155 in that next lower denominational order. Consequently, release of any one of the latch levers 155, as above described, in response to accumulative actuation of the numeral wheel 38 in that order will cause release of all of the latch levers 155 in all lower denominational orders, by virtue of this overlapping relationship between the latch levers, from left to right of the machine. As a result of thus releasing the latching levers 155 in all lower denominational orders, the indicators or shutters 141 in those orders will be moved by their springs 153 from blanking to indicating position, as illustrated in Fig. 1. In that indicating position, the colored indicating portion 146 of sector 142 of each indicator is visually aligned with the cipher-shaped aperture 138 in the associated numeral wheel 38, so that an "0" having the same color as the ordinal indicator on the numeral wheel is thereby disclosed through the associated sight aperture in the casing 21. Consequently, all of the numerical indicia, including all ciphers which are significant, in the registered answer or result are rendered clearly visible to the operator following any actuation of the accumulator. The distinctive color of the significant ciphers thus visually indicates that, in reading the answer or result containing the same, a digit value will be found in some higher denominational order. Hence, accurate recording of the result registered in the accumulator is promoted, and errors in reading are substantially eliminated by this indicating means.

This well-known significant digit mechanism also includes means for returning the shutters or indicators 141 from their indicating or broken line position of Fig. 3 to their normal or blanking position of Fig. 4 automatically in response to a regular zeroizing operation of crank 71. This indicator resetting means comprises a plurality of links 171 (Fig. 1) and three-armed bell crank levers 172 spaced transversely of the machine, each link 171 being pivotally connected at its rear end at 173 to a rearward extension of one of the links 82 and pivotally connected at 174 at its forward end to the lower arm of one of the levers 172. The levers 172 are rotatably mounted on shaft 83, and the rearwardly extending arm of each lever is pivotally connected at 173 to the lower end of an upwardly extending link 176. The upper ends of the links 176 are pivotally mounted on a transverse rod 177 (Figs. 1 and 4) which extends across the machine through suitable apertures in the skeleton frame plates and is swingably suspended from the numeral wheel shaft 37 by curved links 178. With this arrangement, rocking of shaft 78 in a regular zeroizing operation in response to forward movement (to the left in Fig. 1) of handle 71, in addition to forward swinging of the accumulator rock frame to gear-detraining position as previously explained, also pulls links 176 down to swing rod 177 arcuately forwardly from its rearward position of Fig. 1 to its forward or operated position of Figs. 3 and 4. The rod 177 engages the resetting arms 143 of the indicators or shutters 141 in such swinging movement to return all of the actuated indicators to their blanking position against the action of their springs 153, which normally results in all of the latch levers 155 being returned by their springs 162 to the latching position of Fig. 4, wherein the latching arms 144 of the indicators 141 are thereby restrained against downward movement. It will be understood, of course, that just as soon as any one of the digit keys 25 subsequently is depressed, the accumulator rock frame will thereby immediately be returned rearwardly to its gear-engaging position of Fig. 1 to entrain gears 32 with gears 31, that the resulting return of links 82 to their rearward position of Fig. 1 will cause return of the members 171—178 to their positions of this figure, which includes upward and rearward arcuate swinging of rod 177 from its forward position of Fig. 4 to its position of Fig. 1, and that all of this action takes place before any additive rotation of the gears 31, 32 in the denominational order of the depressed digit key 25.

The old mechanism herein illustrated also includes split accumulator mechanism selectively settable to prevent clearing of certain denominational orders of the accumulator, such as the left half, in response to operation of the zeroizing handle 71 to enable optional use of the machine either as one having a single accumulator or as one having two separate accumulators. This split accumulator mechanism is identical with that disclosed in detail in Patent No. 2,599,257, the reference numerals used herein being the same employed in that patent to identify similar parts, and comprises a zeroizing control member or key 301 (Fig. 1) disposed at the right side of the machine (Fig. 9) and selectively settable to either its normal raised or inoperative position of Figs. 1 and 8 or its operative or depressed position of Fig. 7. At its lower end, the control key 301 is pivotally connected to the rear end of a lever 302, the forward end of which is rotatably mounted on the shaft 83, and a coil spring 303 is interconnected between the lever 302 and the machine frame to urge the control member 301 upwardly into its inoperative position. The stem of control key 301 is provided with a forwardly extending (to the right in Figs. 7 and 8) recessed lug 307 and a rearwardly extending horizontal shoulder or shelf 308. Positioned and controlled by the shelf 308 is the rear end of a crank arm 309 which is rigidly secured at its forward end to the right end of a flatted transverse control shaft 311. As shown in Fig. 9, a plurality of detent lever assemblages, each indicated generally by reference numeral 315, are mounted respectively in selected denominational orders of the machine (herein illustrated as those at the left side thereof) on a transverse shaft 316 which extends through, and is suitably journalled in, the several skeleton frame plates 22, 23. The rear end of each detent 315 overlies the flatted shaft 311, and its forward end is disposed below the denominationally associated numeral wheel gear 36 and normally maintained by gravity out of engagement therewith. Included as a part of each detent lever assemblage 315 is a coil spring 321, one end of which engages under the transverse portion of the detent lever and the other end of which engages under the forwardly extending end of the lever and terminates in a forward end portion 323 curved downwardly away from the lever and normally resting upon the transverse rod 177.

The operation of this split accumulator mechanism is as follows. When the machine is in normal condition, the control key 301 is in its raised position of Figs. 1 and 8 wherein the spring 303, shelf 308 and crank arm 309 maintain the flatted portion of shaft 311 angularly disposed in a downwardly and forwardly directed plane. Movement downwardly and rearwardly of control key 301 to its position of Fig. 7 permits crank arm 309 and shaft 311 to rotate sufficiently in a counterclockwise direction (viewing Figs. 7 and 8, clockwise viewing Figs. 3, 4 and 5) to assume its inactive position of Fig. 7 in which the flatted portion of the shaft is disposed in a plane more nearly horizontal than when the shaft is in its active or blocking position of Fig. 8. In either selectively adjustable position of Figs. 7 or 8 of the control key 301, spring 303 cooperates with the recessed lug 307 and shaft 311 to maintain these parts in such adjusted positions. As previously explained, operation of the zeroizing handle 71 results in detraining of all of the gears 32 from their associated gears 31 and a forward arcuate swinging of rod 177 from its rearward position of Figs. 1 and 9 to its forward position of Fig. 4. This causes the rod 177 to lift the forwardly extending and downwardly curved ends 323 of the springs forming part of the detent levers 315. When the zeroizing control member 301 is in its depressed or active position of Fig. 7, such lifting of the forward ends 323 of the detent lever springs engages the forward ends of these detent levers 315 with the teeth of their associated numeral wheel gears 36 which prevents zeroizing of those denominational orders of the accumulator in which the detent levers 315 are disposed. However, if the control key 301 is in its raised or inactive position of Figs. 1 and 8, shaft 311 is thereby retained in its blocking position, whereby lifting of the forward ends 323 of their springs by rod 177 is rendered ineffective by virtue of the rear ends of the detent levers being blocked against movement by shaft 311. As a result, the ends 323 of the springs 321 are thereby merely displaced upwardly by rod 177 relative to the detent levers 315 without engaging the latter with their numeral wheel gears 36, and all denominational order of the accumulator are zeroized. In other words, with the shaft 311 in its position of Fig. 7, it is inoperative to effect the detent lever blocking function which it performs in its active position of Fig. 8. Thus, dependent upon the selective position to which control key 301 has been moved, all or one portion only of the various denominational orders of the accumulator will be cleared in response to actuation of the zeroizing handle 71. It will be appreciated that return of control key 301 to its normal position of Fig. 8 from its position of Fig. 7, immediately following actuation of the zeroizing handle 71 to clear the right-hand portion of the accumulator in which no detent levers 315 are provided, will automatically effect zeroizing of the left-hand portion of the accumulator in which the detent levers 315 are provided, because such operation of key 301 will cause shaft 311 to disengage the detent levers 315 from their associated numeral wheel gears 36. Following operation of the zeroizing crank 71 with the control key 301 in its operative or depressed condition of Fig. 7, depression of any one of the digit keys 25, as previously explained, will effect re-engagement of all of the numeral wheel driving gears 31 by their carrying gears 32 and return of the transverse rod 177 rearwardly to its position of Figs. 1 and 9. This will enable the several detent levers 315 to be returned to their normal inoperative positions, and subsequent operation of zeroizing handle 71 will clear only those orders of the accumulator not having the detent levers 315, with the remaining orders in which the detent levers are operative being prevented from being zeroized.

As initially noted herein, when these prior split accumulator and significant digit indicator mechanisms were incorporated in the same machine, it was found necessary to eliminate the interconnection between the adjacent denominational orders of the indicating mechanisms at the point of the split in order to prevent erroneous reading of the various answers or results and to visually maintain those registrations in the different portions of the accumulator apart from each other when the machine was set for split operation. The operating arm 161*a* (Figs. 2 and 9) of the latch lever or shutter trip-off crank 155 in the lowest denominational order of the machine to which a detent lever 315 had been added was cut off or shortened sufficiently to prevent that latch lever 155 from operating the adjacently located latch lever in the next lowest denominational order of the machine in normal manner. In other words, the overlapping relationship between adjacent latch levers 155 thereby was broken at the point of split. Consequently, whenever any digit key was actuated in the left portion of the machine, the significant digit indicator or shutter 141 in that order was moved to indicating position as usual, as well as all shutters of lower denominational orders down to the point of split, but the significant digit indicators 141 in the right-hand portion of the accumulator would not be actuated. While this had the effect of proper indication and reading of separate answers in the different portions of the accumulator when the machine was set for split operations, it resulted in inaccurate or improper operation of the significant digit indicators during normal use of the machine. The present invention eliminates such erroneous reading by providing novel bridging mechanism between the lowest denominational order of the left portion of the accumulator and the highest order of the right portion which normally actuates the significant digit indicator in the latter order in response to operation of an indicator in any higher order and is rendered inoperative automatically in response to setting of the machine for split operation. This novel bridging mechanism is illustrated in Figs. 2, 5, and 7–12 and comprises a bridging lever and bridging lever blocking pawl indicated generally, respectively, by reference numerals 401 and 402. These two members 401 and 402 are mounted in the highest denominational order of the right portion of the machine, or at the point of split, for pivotal movement on the shaft 316. As best seen in Fig. 9, a suitable spacer sleeve 403 also is mounted on this transverse shaft 316 to retain the members 401, 402 between adjacent skeleton frame plates 23 and against lateral displacement on shaft 316. The physical characteristics of members 401 and 402 are best illustrated in Figs. 10, 11 and 12.

Figure 5:
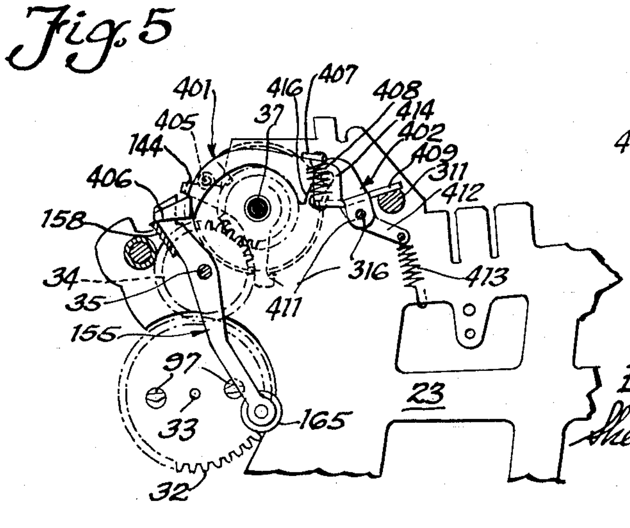
Fig. 5 is a detail longitudinal section, taken substantially on line 5—5 of Fig. 2, specifically illustrating the bridging mechanism employed between the split orders of the accumulator.

The bridging lever 401 (Fig. 10) is provided at its rear end with a hub portion 404 for pivotally mounting the same on the shaft 316, the spacer sleeve 403 being disposed on this shaft between such hub portion and the adjacent frame plate 23. Near its forward end, this curved bridging lever 401 has a laterally extending pin 405 suitably secured thereto which rests upon the upper edge of the latching arm 144 (Fig. 4) of the significant digit indicator 141 in the next higher denominational order, which comprises the lowest order of the left-hand portion of the accumulator in the instant embodiment. The forward end of lever 401 terminates in an offset finger 406 which is normally disposed directly above the transverse portion 158 of the latch lever or shutter trip-off crank 155 in the highest denominational order of the right-hand portion of the accumulator, as best seen in Figs. 2, 7 and 9. The upper edge of the bridging lever 401 is provided near its rear end with a laterally extending tab or shelf 407 which overlies and is engaged by the upper end of a coil spring 408 (Figs. 5 and 9) which is interconnected between that shelf 407 and the forward end of the substantially horizontal main body portion of the blocking pawl 402. As best seen in Figs. 11 and 12, this main body portion of blocking pawl 402 is provided with a rearwardly extending finger 409 and terminates at its right side in a downwardly bent ear 411. A similar downwardly bent portion 412 is disposed at the left side of the main body of blocking pawl 402 which is parallel with the ear 411 and, with the latter, is suitably apertured to receive the shaft 316 for pivotally mounting the blocking pawl thereon. This left-hand vertical portion 412 extends rearwardly for connection to the upper end of a spring 413 (Figs. 5 and 7–9), the lower end of which is connected in any suitable manner to the adjacent skeleton frame plate 23 to maintain the finger 409 of the blocking pawl in engagement with the flatted transverse shaft 311. The forward end of blocking pawl 402 is provided with an upwardly bent portion 414 in the plane of the downwardly bent portion 412, and a shouldered stud 415 extends to the left of, and is secured in any suitable manner to, the upper end of this vertical portion 414. The horizontal shaft portion of stud 415 extends laterally freely through a curved slot 416 provided in the bridging lever 401 adjacent its rear end and extending upwardly from the lower edge thereof (Figs. 5, 7 and 8).

With these members 401 and 402 mounted at the point of the split in the machine in this manner, the stud 415 will be disposed at the upper end of the slot 416 to prevent downward movement of the forward end of bridging lever 401 whenever the machine is set for split accumulator operation by virtue of the spring 413 holding blocking pawl 402 in its active position of Fig. 7. However, whenever the zeroizing control key 301 is moved upwardly from its operative position of Fig. 7 to its raised or inoperative position of Fig. 8, the resulting clockwise rotation of the flatted control shaft 311 produces a cam action against the under surface of the rearwardly extending finger 409 to raise the latter and swing the blocking pawl 402 about shaft 316 in a clockwise direction (as seen from the left side of the machine) and against the action of spring 413. The stud 415 thus is lowered to its position of Fig. 8, where it is initially somewhat below the upper end of the slot 416, to permit clockwise rotation of bridging lever 401 or depression of its forward end from the normal raised position of Fig. 7 to its actuated or lowered position of Fig. 8. Of course, the forward end of the bridging lever 401 will not be permitted to drop to such actuated position until the significant digit indicator 141 in the next higher denominational order has been moved, as previously described, from its blanking to its indicating position. This is because the latching arm 144 of that shutter 141 is engaged by the pin 405 of the bridging lever and must be moved downwardly from its position of Fig. 4 to permit downward movement of pin 405. When the bridging lever 401 thus is permitted to drop in response to movement of the shutter 141 in the next higher denominational order to indicating position with the machine set for normal operation, the offset finger 406 of the lever will trip or move the latch lever 155 in the highest denominational order of the right portion of the accumulator from its active or latching position of Fig. 7 to its released position of Fig. 8. The significant digit indicators 141 in this order, and in all lower orders in which previous actuation has not taken place, thus will be enabled to move to their indicating position. Consequently, when the machine is set for normal operation, the significant digit indicators or shutters 141 are actuated in the same manner as though that latch lever 155 having the shortened operating arm 161*a* had an operating arm 161 of normal length which would trip-off or trigger the adjacent latch lever 155 in the next lower denominational order. At the same time, whenever the machine is set for split accumulator operation by depression of the control key 301 to its position of Fig. 7, successive downward or serial operation from higher to lower denominational orders of the significant digit indicators or shutters 141 from any order in the left-hand portion of the accumulator is automatically terminated at the point of split, being prevented from continuing into the right-hand portion of the accumulator by the bridging lever blocking pawl 402. Proper operation of the significant digit indicators thus is assured during both regular and split operations of the machine. To make certain that the above-described action of the bridging lever 401 and its blocking pawl 402 are clearly understood, I wish to point out that these parts and zeroizing control key 301 and latching lever or shutter trip-off crank 155 are shown in Fig. 7 in the positions assumed immediately following depression of key 301 to set the machine for split accumulator operations, and before any digital actuation has been effected in the highest denominational order of the right-hand portion of the accumulator. In those positions of Fig. 7, the stud 415 of pawl 402 is at the upper end of slot 416 in lever 401, so that lowering of the offset finger 406 at the forward end of lever 401 is prevented, even when the shutter 141 in the next higher order (the lowest order of the left-hand portion of the accumulator) is released to drop its latching arm 144 down from supporting engagement with the pin 405 of the bridging lever 401. On the other hand, these parts are illustrated in Fig. 8 in the positions resulting from the machine having been set for normal operations (key 301 raised and stud 415 of pawl 402 lowered by shaft 311), and following dropping of the shutter 141 in the lowest order of the left-hand portion of the accumulator to its indicating position, the bridging lever 401 having been actuated by spring 408 to lower its forward finger 406 to trip or released the latching lever 155 in the highest order of the right-hand portion of the accumulator.

Figure 6:
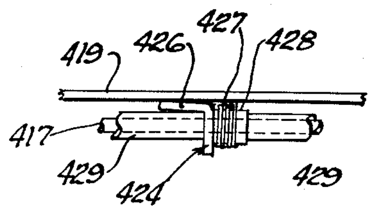
Fig. 6 is a detail transverse section taken substantially on the line 6—6 of Fig. 4.

As will be appreciated from the preceding description, whenever a zeroizing operation is performed, the transverse rod 177 is swung forwardly from its position of Fig. 1 to that of Fig. 4, which results in all of the shutters or significant digit indicators 141 being returned to their blanking position. This enables all of the shutter trip-off cranks 155 to return to their latching position of Fig. 4 to latch the shutters in such blanking position. With the mechanism hereinbefore described, such latching of the significant digit indicators 141 in blanking position in response to operation of the zeroizing handle 71 will be effective in all orders of the machine even when the latter is set for split accumulator operation with the zeroizing control member 301 in its depressed position of Fig. 7. As has previously been described, the net result of this arrangement is improper operation of the significant digit indicators or shutters 141 in the left-hand portion of the accumulator when the machine is set for split operations. The present invention, therefore, includes novel mechanism which is normally inoperative when the machine is set for regular operation and is automatically rendered effective, on depression of the control key 301 to set the machine for split accumulator operation, to prevent return to latching position of any latch lever 155 disposed in the left portion of the machine which has been moved to released position. In other words, this novel mechanism, which is rendered operative in response to depression of control key 301, latches each actuated shutter trip-off crank or latch lever 155 that is disposed in a denominational order containing a detent lever 315 in released position until the control key 301 is returned to its raised or inoperative position of Fig. 8. This novel latch retaining mechanism is best illustrated in Figs. 2–4, 6 and 9. A transverse shaft 417 is mounted forwardly of the accumulator across at least all denominational orders containing the detent levers 315, herein illustrated as the left-hand portion of the machine, by means of suitable brackets 418 which may be anchored in any desired manner, as by attachment to the adjacent tie rod 24 and skeleton frame plates 22, 23 (Figs 3 and 9). A U-shaped bail 419 has its apertured parallel ends rotatably mounted on this transverse shaft 417, with such left end 421 extending downwardly as a crank arm pivotally interconnected by a link 422 (Fig. 3) to a crank arm 423, in turn secured in any suitable manner at its upper end to the flatted shaft 311. Mounted on the transverse shaft 417 in each denominational order of the machine containing a detent lever 315, except the overflow order at the extreme left-hand end of the accumulator, is a latch pawl 424. The forward end of each pawl 424 terminates in a downwardly extending nose 425 (Fig. 4) for cooperation with the denominationally associated latch lever 155 in a manner to be later described. The forward end of each latch pawl 424 is suitably apertured to receive the transverse shaft 417, and as best seen in Figs. 4 and 6, terminates in a laterally extending flange 426 which is normally resiliently held against the rear surface of the bail or bracket 419 by a coil spring 427. Each pawl 424 preferably is provided with a hub portion 428 (Fig. 6) which receives the main body portion of spring 427, one end of the latter engaging against the rear surface of bail 419 (Fig. 4) and the other end of the spirng being curled over the upper edge of the pawl 424. Suitable spacer sleeves 429 (Figs. 6 and 9) are mounted on the shaft 417 and interposed between the latch pawls 424 to maintain the latter against lateral shifting.

The operation of this shutter trip-off crank latching or retaining mechanism is as follows. When the zeroizing control key 301 is in its inactive or raised position of Fig. 8, control shaft 311 is disposed in its blocking position of Fig. 4. With the parts so arranged for normal use of the machine, link 422 retains bail 419 in its position of Fig. 4, and the transverse portion of this bail cooperates with the flanges 426 to maintain all of the latch pawls 424 in their inoperative raised positions. Depression of control key 301 to its active position of Fig. 7 to set the machine for split accumulator operations results in rotation of control shaft 311 to its inactive position of Fig. 3. Such rotation of shaft 311 from its position of Fig. 4 to that of Fig. 3 causes link 422 to swing bail 419 clockwise (as viewed from the right side of the machine) to its inactive position of Fig. 3. As will best be appreciated from Fig. 4, springs 427 thus will be permitted to depress their latch pawls 424, such downward movement of the rear ends of these pawls being terminated by engagement of their noses 425 with the transverse portions 158 of the associated latch levers 155. As soon as any latch lever of shutter trip-off crank 155 in those orders containing latch pawls 424 thereafter is moved from its latching position of Fig. 4 to its released position of Fig. 3, in the manner previously described, the denominationally associated pawl 424 will be moved further downward by its spring 427 to effect latching engagement of its nose 425 with the transverse portion 158 of the actuated or released lever 155 as illustrated in Fig. 3. Consequently, subsequent actuation of zeroizing handle 71 to effect a clearing of the right-hand portion of the accumulator will not result in the actuated latch levers 155 in the left portion of the machine being returned to latching position, those levers 155 then being latched or maintained in released position by their associated latch pawls 424. It will be understood, of course, that the transverse rod 177 maintains the shutters 141 in their blanking position until any one of the digit keys 25 subsequently is actuated, whereupon rod 177 is returned to its rearward position of Fig. 1 and those shutters in the left portion of the accumulator which previously had been moved to indicating position return automatically thereto. It will also be understood that by virtue of this arrangement zeroizing of the left portion of the accumulator immediately following clearing of the right portion thereof, by returning control key 301 to its normal raised position, will automatically effect rearrangement of the parts into their normal positions, including lifting of the latch pawls 424 to their inoperative position of Fig. 4, which will permit those latch levers 155 which had been held thereby in released position to be returned by their springs 162 to shutter latching position. Consequently, the feature of the prior split accumulator mechanism of enabling zeroizing of the left portion of the accumulator merely in response to return of control key 301 to its raised position, if accomplished immediately following operation of zeroizing crank 71 and before depression of any digit key 25, will not be impaired or affected in any way.

Operation of the latch pawls 424 by bail 419 and springs 427 in the manner described is permitted by virtue of the clearance provided between the upper edges of pawls 424 and the bail 419, as best seen in Fig. 4, whereby limited pivotal movement of each pawl 424 relative to bail 419 may be effected in a counterclockwise direction, but is prevented in the opposite direction from either of its positions of Figs. 3 or 4 by engagement of flange 426 with the bail. Thus movement of bail 419 from its active position of Fig. 4 to its inactive position of Fig. 3 does not require accompanying movement of pawls 424 to their actuated position of Fig. 3, but only permits them to fall to an intermediate active position, with their noses 425 resting on the upper edges of the transverse portions 158 of the associated levers 155. As soon as the latter are moved to their released position of Fig. 3, of course, the associated pawls 424 will be depressed by their springs 427 to the actuated or retaining position of Fig. 3. The several parts are shown in Fig. 3 with the machine set for split accumulator operation, the shutter trip-off crank or latch lever 155 in the lowest order of the left-hand portion of the accumulator latched in released position by virtue of a digital actuation having taken place in that or any higher denominational order, and the denominationally associated shutter 141 returned to blanking position by rod 177 in response to actuation of zeroizing handle 71. This showing is for the specific purpose of illustrating that the previously actuated shutters 141 will not be retained in such returned or blanking position by their latch levers 155 in those orders having latch pawls 424, following rearward swinging of rod 177 in response to subsequent actuation of any digit key 25, but will immediately be returned to indicating position by their springs 153. It also shows that immediate return of control key 301 to its raised position, which will zeroize the left-hand portion of the accumulator, will permit automatic return of the previously latched levers 155 to their latching position of Fig. 4 to latch the shutters 141 in blanking position.

The reason that no latch pawl 424 is mounted in the leftmost overflow order of the machine is because it makes no difference whether the shutter 141 in that order is in blanking or indicating position after a tens carry has taken place into such overflow order, since the cipher-shaped aperture 138 of the numeral wheel 38 therein will then be moved out of register with the associated sight aperture in the machine casing. Of course, a shutter 141 is provided in the overflow order in order to maintain normal uniformity of appearance and to enable the same numeral wheel to be used therein as in other denominational orders. But in the overflow order, the shutter 141 is never moved to indicating position except in response to a tens carry into that order. Consequently, there is never any occasion requiring movement of the shutter 141 to indicating position in this overflow order to trigger off the latch levers or shutter trip-off cranks 155 in the lower denominational orders. As a result, the shutter trip-off crank 155 in the overflow order is constructed like that in the lowest order of the left-hand portion of the accumulator, or the lowest order containing split accumulator mechanism, with a shortened operating arm 161*a* (Figs. 2 and 9). The primary reason for using such a shutter trip-off lever 155 in the overflow order is that it facilitates accurate adjustment in the assembly of the parts during manufacture of the machine, and this is of importance because the serial operation of the shutter trip-off levers 155 results in a building up or accumulation of any variations in the configuration or assembled position of these latch levers 155 from a perfect shape or positioning thereon. It also will be appreciated that although the shutters 141 must be actuated serially from left to right only in a triggering action in response to movement of any one of them into indicating position, in order to perform their intended indicating function, the split accumulator mechanism need not be located in the left-hand portion of the accumulator, as illustrated in the instant embodiment of the invention, but may be disposed in any desired denominational orders of the machine.

It is thought that the invention and many of its attendant advantages will be understood from the foregoing description, and it will be apparent that various changes may be made in the form, construction and arrangement of the parts without departing from the spirit and the scope of the invention or sacrificing all of its material advantages, the form hereinbefore described being merely a preferred embodiment thereof.

I claim:

1. A calculating machine, comprising a multidenominational order accumulator, means for actuating said accumulator, significant digit indicating means including in each denominational order of said accumulator an indicator normally disposed in a blanking position and movable to an indicating position and a latch member normally disposed in latching position to maintain said indicator in blanking position and movable to a released position in response to actuation of said accumulator in the same or any higher denominational order, zeroizing means for clearing said accumulator, means operable in response to actuation of said zeroizing means for restoring any of said latch members to latching position that may have been moved to released position and for restoring said indicators to blanking position, split accumulator mechanism selectively settable to prevent clearing of certain denominational orders of said accumulator by said zeroizing means, and normally inactive latching means in said certain denominational orders selectively settable by said split accumulator mechanism between normal inactive position and an active position to supercede said restoring means and retain the denominationally associated latch members previously moved to released position in such released position.

2. In a calculating machine having a multidenominational order accumulator, and means for actuating said accumulator; significant digit indicating means, comprising an indicator in each denominational order of said accumulator normally disposed in a blanking position and movable to an indicating position, a latch member in each denominational order of said accumulator normally disposed in latching position to maintain said indicator in blanking position and movable to a released position in response to actuation of said accumulator in the same or any higher denominational order, and means for moving each indicator to indicating position upon movement of its associated latch member to released position; zeroizing means for clearing said accumulator and returning said indicators from indicating position to blanking position, means operable in response to actuation of said zeroizing means for restoring said latch members to latching position and for restoring said indicators to blanking position, split accumulator mechanism selectively settable to prevent clearing of certain denominational orders of said accumulator by said zeroizing means, and normally inactive latching means in said certain denominational orders selectively settable by said split accumulator mechanism between normal inactive position and an active position to supercede said restoring means and retain the denominationally associated latch members in released position that previously were moved to such released position.

3. A calculating machine, comprising a multidenominational order accumulator, means for actuating said accumulator, significant digit indicating means mounted in each denominational order of said accumulator operable in response to actuation of said accumulator in any denominational order to give significant digit indications in all denominational orders lower than that in which an actuation is effected, zeroizing means for clearing said accumulator and returning said significant digit indicating means to normal position, split accumulator mechanism including a normally inoperative zeroizing control member selectively settable to operative position to prevent clearing of one portion of said accumulator while not affecting clearing of another portion thereof in response to operation of said zeroizing means, normally inoperative means rendered operative in response to setting of said zeroizing control member to operative position to limit subsequent operation of said indicating means to those indicating means associated with that said portion of the accumulator which includes the particular denominational order in which an actuation is effected, and a second normally inoperative means rendered operative in response to setting of said zeroizing control member to operative position to prevent returning of those said significant digit indicating means to normal position which are associated with said one of said portions of the accumulator upon subsequent operation of said zeroizing means.

4. In a calculating machine having a multidenominational accumulator, means for actuating said accumulator, zeroizing means for clearing said accumulator, and split accumulator mechanism including a normally inoperative zeroizing control member selectively settable to operative position to prevent clearing of certain denominational order of said accumulator in response to operation of said zeroizing means; significant digit indicating mechanism, comprising an indicator mounted in each denominational order of said accumulator, means constraining each said indicator to move from a normal to an indicating position, a first latching means for retaining each of said indicators in said certain denominational orders in normal position against the action of their constraining means and cooperating serially with each other each to move all of said latching means in lower ones of said certain orders to an indicator releasing position when moved to such releasing position, a second latching means for retaining each of the remaining said indicators in normal position and cooperating serially with each other when moved to releasing position each to move all of said second latching means in lower orders to releasing position, means for moving each said latching means to releasing position in response to actuation of the accumulator in the associated denominational order, bridging means for moving said second latching means of highest denominational order to releasing position in response to movement of said indicator in the lowest of said certain denominational orders to indicating position, and normally inoperative means automatically rendered operative to prevent such operation of said bridging means in response to setting of said zeroizing control member to operative position.

5. In a calculating machine according to claim 4, means operable in response to actuation of said zeroizing means to return to indicator retaining position each of said first and second latching means that have been moved to releasing position, and a third normally inactive latching means movable to active position in response to setting of said zeroizing control member to operative position to retain in indicator releasing position each of said first latching means thereafter moved to releasing position, whereby to prevent return of said first latching means to indicator retaining position in response to operation of said zeroizing means.

6. In a calculating machine according to claim 5, means operable in response to selective return of said zeroizing control member to normal inoperative position, following operation of said zeroizing means and before further operation of said actuating means, to move said third latching means to inactive position to permit return of said first latching means to indicator retaining position, whereby said machine is conditioned for normal operation.

7. In a calculating machine having a multidenominational accumulator, means for actuating said accumulator, zeroizing means for clearing said accumulator, and split accumulator mechanism including a normally inoperative zeroizing control member selectively settable to operative position to prevent clearing of certain denominational orders of said accumulator in response to operation of said zeroizing means; significant digit indicating mechanism, comprising an indicator mounted in each denominational order of said accumulator, means constraining each said indicator to move from a normal to an indicating position, a first latching means for retaining each of said indicators in said certain denominational orders in normal position against the action of their constraining means and cooperating serially with each other to move all of said latching means in lower ones of said certain orders to an indicator releasing position when moved to such releasing position, a second latching means for retaining each of the remaining said indicators in normal position and cooperating serially with each other when moved to releasing position each to move all of said second latching means in lower orders to releasing position, means for moving each said latching means to releasing position in response to actuation of the accumulator in the associated denominational order, means for restoring each said latching means to indicator retaining position in response to operation of said zeroizing means, and a third normally inactive latching means movable to active position in response to setting of said zeroizing control member to operative position to retain in indicator releasing position each of said first latching means thereafter moved to releasing position, whereby to prevent return of said first latching means to indicator retaining position in response to operation of said zeroizing means.

8. In a calculating machine having a multidenominational order accumulator, means for actuating said accumulator, zeroizing means for clearing said accumulator, and split accumulator mechanism including a normally inoperative zeroizing control member selectively settable to operative position to prevent clearing of certain denominational orders of said accumulator in response to operation of said zeroizing means; significant digit indicating mechanism, comprising an indicator mounted in each denominational order of said accumulator, means constraining each said indicator to move from a blanking to an indicating position, a first latch lever for retaining each of said indicators in said certain denominational orders in blanking position and cooperating serially with each other when moved to an indicator releasing position each to move all of said latch levers in lower ones of said certain orders to releasing position, a second latch lever for retaining each of the remaining said indicators in blanking position and cooperating serially with each other when moved to releasing position each to move all of said second latch levers in lower orders to releasing position, and means for individually moving each said latch lever to indicator releasing position in response to actuation of the accumulator in the associated denominational order; a bridging lever operable in response to movement of said indicator in the lowest of said certain denominational orders to indicating position to move said second latch lever of highest denominational order to indicator releasing position, and a normally inoperative blocking member movable to operative position, in response to setting of said zeroizing control member to operative position, into the path of movement of said bridging lever to prevent operation thereof.

9. In a calculating machine according to claim 8, means operable in response to actuation of said zeroizing means to return said indicators to blanking position and each of said latch levers that have been moved to releasing position to indicator retaining position, and a third normally inactive latch lever movable to active position in response to setting of said zeroizing control member to operative position to retain in indicator releasing position each of said first latch levers thereafter moved to releasing position to prevent return of said first latch levers to indicator retaining position in response to subsequent operation of said zeroizing means.

10. In a calculating machine according to claim 9, means operable in response to selective return of said zeroizing control member to normal inoperative position, following operation of said zeroizing means and before further operation of said actuating means, to move said third latch levers to inactive position to permit return of said first latch levers to indicator retaining position to automatically complete conditioning of the machine for normal operation.

11. A calculating machine, comprising an accumulator including denominational orders of numeral bearing elements, actuating mechanism for said accumulator, zeroizing mechanism for clearing said accumulator, split accumulator and clearing mechanism including a normally inoperative zeroizing control member selectively settable to operative position to prevent clearing of said numeral bearing elements in a predetermined group of denominational orders of said accumulator in response to operation of said zeroizing mechanism, whereby setting of said zeroizing control member to operative position functionally segregates said group of denominational orders from the remaining orders of said accumulator, a normally inoperative indicator mounted in each denominational order of said accumulator adjacent the said numeral bearing element therein for direct coaction therewith, indicator operating means responsive to actuation of the accumulator for causing movement of said indicators to operative position in that order containing an actuated numeral bearing element and in all lower denominational orders to provide a visual indication in those of such orders in which a zero is registered by the associated said numeral bearing element, and normally inoperative means rendered operative automatically, in response to setting of said zeroizing control member to operative position, to modify the action of said indicator operating means by limiting the visual indication resulting from actuation of any said numeral bearing element to an indication only in those orders functionally segregated by said zeroizing control member with that of such actuated numeral bearing element.

12. A calculating machine, comprising a multidenominational order accumulator having a numeral wheel in each order, means for actuating said accumulator, zeroizing means for clearing said accumulator, split accumulator and clearing mechanism including a normally inoperative zeroizing control member selectively settable to operative position to prevent clearing in a predetermined group of denominational orders of said accumulator in response to operation of said zeroizing means, a normally inoperative, two-position indicator mounted in each denominational order of said accumulator adjacent the said numeral wheel therein for direct coaction therewith, indicator operating means for causing movement of said indicators from inoperative to operative position in response to actuation of said accumulator in that order containing an actuated numeral wheel and in all lower denominational orders to provide a visual indication in those of such orders in which a zero is registered by the associated numeral wheel, and normally inoperative means rendered operative, in response to setting of said zeroizing control member to operative position, to prevent subsequent operation of any of said indicators in other than said predetermined group of denominational orders by said indicator operating means in response to actuation of said accumulator in any of said group of denominational orders.

13. A calculating machine, comprising a multidenominational order accumulator having a numeral wheel in each order, means for actuating said accumulator, zeroizing means for clearing said accumulator, split accumulator and clearing mechanism including a normally inoperative zeroizing control member selectively settable to operative position to prevent clearing of one portion of said accumulator while not preventing clearing of another portion thereof in response to an operation of said zeroizing means, normally inoperative, two-position significant digit indicator means mounted in each denominational order of said accumulator adjacent the said numeral wheel therein for direct coaction therewith, operating means for causing movement of said indicator means from inoperative to operative position in response to actuation of said accumulator in that order containing an actuated numeral wheel and in all lower denominational orders to give significant digit indications in those of such orders in which a zero is registered by the associated numeral wheel, and normally inoperative means rendered operative in response to setting of said zeroizing control member to operative position to limit subsequent actuation of said indicator means by said operating means to actuation of those indicator means associated with that said portion of the accumulator which includes that particular denominational order in which an actuation is effected.

14. A calculating machine, comprising a multidenominational order accumulator having a numeral wheel in each order, means for digitally actuating said accumulator, zeroizing means for clearing said accumulator, split accumulator and clearing mechanism for preventing clearing of a first portion of said accumulator while not preventing clearing of a second portion thereof in response to operation of said zeroizing means, first and second groups of normally inoperative, two-position indicators associated, respectively, with said first and second portions of said accumulator and each mounted adjacent a said numeral wheel for direct coaction therewith, means for normally operating the indicators of the denominationally lower one of said groups in response to digital actuation in any denominational order of the denominationally higher said portion of the accumulator, and means operable by said split accumulator and clearing mechanism for blocking operation of said last recited means.

15. A calculating machine, comprising a multidenominational order accumulator including means in each order for registering the ordinal numerals of 1 to 9, inclusive, means for actuating said accumulator, significant digit indicating means operable in response to actuation of said accumulator including an indicator mounted in said accumulator adjacent each said registering means for direct coaction therewith and having a blanking position and a cipher indicating position for visually distinguishing between every denominational order of the accumulator not to be read as part of any registered result and every other denominational order thereof, zeroizing means for clearing said accumulator, split accumulator and clearing mechanism for preventing clearing of certain denominational orders of said accumulator by said zeroizing means, and means operable by said split accumulator and clearing mechanism for varying the operation of said significant digit indicating means to cause the latter visually to separate results registered in said certain denominational orders from results registered in any, or all but the highest, of the other denominational orders of said accumulator.

16. A calculating machine according to claim 15, including a latch lever associated with each said indicator for maintaining the same in blanking position and movable to released position to enable operation of said indicator to indicating position, means for returning said indicators to blanking position and said latch levers to latching position for maintaining said indicators in blanking position in response to operation of said zeroizing means, and normally inoperative retaining means disposed in each of said certain denominational orders and rendered operative by said split accumulator and clearing mechanism to retain in released position against the action of said returning means any denominationally associated said latch lever that has been moved to released position.

17. A calculating machine, comprising a multidenominational order accumulator, means for actuating said accumulator, significant digit indicating means in all orders of said accumulator and each operable from a normal blanking position to an indicating position either in response to actuation in the denominationally associated order of said accumulator or in response to operation of said significant digit indicating means in any higher order to visually distinguish all lower denominational orders of said accumulator which register zero from all orders to the left of the highest significant digit therein, zeroizing means operable to clear said accumulator, restoring means operable in response to actuation of said zeroizing means to restore said significant digit indicating means to normal blanking position and to retain the same therein, split accumulator and clearing mechanism selectively settable to prevent clearing of certain denominational orders of said accumulator by said zeroizing means, and normally inactive means disposed in said certain denominational orders and settable to active position by said last means to prevent such retention of said significant digit indicating means in normal blanking position in those of said certain orders in which said significant digit indicatng means have been moved to indicating position before operation of said zeroizing means, so that, upon subsequent actuation of any order of said accumulator, said significant digit indicating means in said certain orders that were moved to indicating position before operation of said zeroizing means will automatically be restored to indicating position.

References Cited in the file of this patent

UNITED STATES PATENTS

| | | |
|---|---|---|
| 1,016,276 | Kilpatrick | Feb. 6, 1912 |
| 1,214,000 | Barrett | Jan. 30, 1917 |
| 2,346,601 | Niemann | Apr. 11, 1944 |
| 2,599,257 | Heitlinger | June 3, 1952 |